United States Patent

Sato et al.

[11] Patent Number: 5,668,069
[45] Date of Patent: Sep. 16, 1997

[54] CUTTING TOOL COMPOSED OF SILICON NITRIDE

[75] Inventors: Masahiro Sato, Kokubu; Yukiyasu Aoyama; Nobuoki Takagi, both of Sendai; Shoji Kohsaka, Kokubu, all of Japan

[73] Assignee: Kyocera Corporation, Kyoto, Japan

[21] Appl. No.: 655,388

[22] Filed: May 30, 1996

[30] Foreign Application Priority Data

May 31, 1995 [JP] Japan ................... 7-133549

[51] Int. Cl.$^6$ ........................... C04B 35/587
[52] U.S. Cl. ........................... 501/97.2; 407/119
[58] Field of Search ............ 501/97, 98; 407/119

[56] References Cited

U.S. PATENT DOCUMENTS

| | | | |
|---|---|---|---|
| 4,881,950 | 11/1989 | Bhat et al. | 501/97 |
| 5,296,008 | 3/1994 | Moriguchi et al. | 501/98 |
| 5,308,561 | 5/1994 | Leimer et al. | 501/97 |
| 5,316,586 | 5/1994 | Suzuki et al. | 501/97 |
| 5,432,132 | 7/1995 | Dasgupta et al. | 501/98 |
| 5,525,134 | 6/1996 | Mehrotra et al. | 501/98 |

*Primary Examiner*—Karl Group
*Attorney, Agent, or Firm*—Loeb & Loeb LLP

[57] ABSTRACT

A cutting tool composed of silicon nitride comprising chiefly a $\beta$-silicon nitride crystal phase and containing a grain boundary phase of rare earth elements, silicon, aluminum, oxygen and nitrogen, wherein the cutting surface is constituted by at least a fired surface or a surface formed by removing and polishing the fired surface by an amount of not larger than 10 μm, and has in the mirror surface thereof a micro-Vicker's hardness which is higher than that of the interior thereof and is not smaller than 16 GPa. The cutting tool has a cutting surface that can be easily worked enabling the cost of working to be decreased, and has a highly hard layer that is suited for cutting cast iron and the like materials featuring increased durability and extended cutting life.

2 Claims, No Drawings

CUTTING TOOL COMPOSED OF SILICON NITRIDE

BACKGROUND OF THE INVENTION

1. Field of the Invention

The present invention relates to an inexpensive cutting tool composed of a sintered product of silicon nitride which is suited for cutting cast iron.

2. Description of the Prior Art

Owing to their excellent heat resistance, thermal shock resistance and oxidation resistance, sintered products of silicon nitride have until now been used as engineering ceramics and, particularly, as components for thermal engines such as turbo rotors. Owing to their high toughness and abrasion resistance, furthermore, the sintered products of silicon nitride have also been used as cutting tools.

In recent years, it has been attempted to utilize a sintered product having a high density and a high mechanical strength as a cutting tool as disclosed in Japanese Laid-Open Patent Publications Nos. 32785/1980 and 73670/1981.

Such a sintered product of silicon nitride is usually obtained by adding thereto, as a sintering assistant, a rare earth oxide such as $Y_2O_3$ or an aluminum compound such as $Al_2O_3$ or AlN followed by firing in a nonoxidizing atmosphere containing nitrogen.

When fired at a high temperature, however, the sintered product of silicon nitride brings about such a problem that the surface of the sintered product is coarsened since silicon nitride is subject to be decomposed. To suppress the decomposition of the silicon nitride, the silicon nitride has heretofore been fired in a pressurized atmosphere of a nitrogen gas.

Even though the silicon nitride can be fired in a nitrogen atmosphere, however, there still remains a problem in that it is not possible to completely suppress the surface from being coarsened. When such a sintered product were to be used as a cutting tool, therefore, the fired surface has to be worked like a mirror surface by removing and polishing the coarsened surface by an amount of not smaller than 100 μm. Besides, the cutting tool having a very complex shape requires a very extended period of time for polishing the surface resulting in an increase in the working cost and an increase in the cost of production.

The sintered product of silicon nitride generally has a Vicker's hardness of about 15 MPa in the mirror surface thereof, and it is desired to further increase the hardness and strength so that it can be used as a cutting tool.

SUMMARY OF THE INVENTION

The object of the present invention, therefore, is to provide a sintered product of silicon nitride which exhibits excellent property for cutting cast iron and the like materials, making it possible to simplify the working at the time of producing a cutting tool and to greatly decrease the cost of production.

The present inventors have first forwarded the study based on such a standpoint that, to simplify the working, it is important to improve mechanical properties of the fired surface and to minimize the coarsening on the fired surface. The inventors have discovered the fact that when a rare earth oxide, an aluminum compound and a silicon oxide are added as sintering assistants and are sintered in an atmosphere containing a nitrogen gas and an SiO gas, the sintering property is improved and, at the same time, the surface coarseness decreases. The inventors have further discovered the fact that a layer having a hardness higher than that of the interior of the sintered product can be formed on the surface of the sintered product when the amounts of the rare earth oxide and the silicon oxide are controlled to lie within a particular composition range, and have thus arrived at the present invention.

That is, a cutting tool composed of silicon nitride of the present invention comprises chiefly a β-silicon nitride crystal phase and contains a grain boundary phase of rare earth elements, silicon, aluminum, oxygen and nitrogen, wherein the cutting surface is constituted by at least a fired surface or a surface formed by removing and polishing the fired surface by an amount of not larger than 10 μm, and has in the mirror surface thereof a micro-Vicker's hardness which is higher than that of the interior thereof and is not smaller than 16 GPa.

PREFERRED EMBODIMENTS OF THE INVENTION

According to the present invention, the cutting tool is composed of a sintered product of silicon nitride which comprises chiefly a β-silicon nitride crystal phase and contains a grain boundary phase of rare earth elements, silicon, aluminum, oxygen and nitrogen. According to the present invention, the cutting surface of the sintered product is constituted by at least a fired surface or a surface formed by removing and polishing the fired surface by an amount of not larger than 10 μm. That is, the sintered product has a favorable surface without being coarsened even on the fired surface. Even when the surface has to be polished, the polishing needs be effected by an amount of 10 μm at the greatest to obtain a favorable surface.

According to the present invention, furthermore, the cutting tool has a surface layer having a hardness higher than that of the interior thereof. The cutting surface formed by the highly hard surface layer has a hardness of not smaller than 16 GPa as measured by a micro-Vicker's hardness measuring method. The surface layer having a high hardness exhibits high performance for cutting cast iron and the like materials. When the hardness is lower than 16 GPa, excellent cutting performance is no longer exhibited. It is desired that the hardness in the interior of the sintered product is not smaller than 15 GPa.

The sintered product of silicon nitride constituting the cutting tool contains, in addition to silicon nitride, rare earth elements, aluminum and impurity oxygen in a total amount of from 5 to 25 mol % and, particularly, from 8 to 20 mol % reckoned as oxides of rare earth elements, as an oxide of aluminum and as $SiC_2$ of impurity oxygen. More concretely speaking, rare earth elements are contained in amounts of from 1 to 10 mol % reckoned as oxides thereof, aluminum is contained in an amount of from 1 to 10 mol % reckoned as $Al_2O_3$, and impurity oxygen is contained in an amount of from 3 to 20 mol % reckoned as $SiO_2$. The impurity oxygen stands for the amount of remaining oxygen of when the amounts of oxygen bonded as oxides of rare earth elements and as oxide of aluminum are subtracted from the whole amount of oxygen in the sintered product. According to the present invention, the molar ratio $SiO_2/RE_2O_3$ of rare earth elements reckoned as $RE_2O_3$ to remaining impurity oxygen reckoned as $SiO_2$ is from 2 to 5 and, particularly, from 2.3 to 4.

Examples of rare earth elements used in the present invention include Y, Er, Yb and Lu. Among them, Y is desired from the standpoint of low cost.

Described below is a method of producing a cutting tool composed of silicon nitride. First, a silicon nitride powder is provided as a starting powder. The silicon nitride powder is an α-Si$_3$N$_4$ powder or, preferably, the one containing not less than 80% of α-Si$_3$N$_4$. It is desired that the powder has a particle diameter of from 0.4 to 1.2 μm. There are further provided powders of oxides of rare earth elements, a powder of silicon oxide and a powder of an aluminum compound such as Al$_2$O$_3$ or AlN, as additives for the silicon nitride powder. These components are contained in a total amount of from 5 to 25 mol % and, particularly, from 8 to 20 mol %. In this case, the silicon oxide also includes oxygen that is inevitably contained in the starting silicon nitride powder and that is reckoned as SiO$_2$ in addition to the one added as the silicon oxide powder.

Concretely speaking, these additives are added in amounts as follows: 1 to 10 mol % of oxides of rare earth elements, 1 to 10 mol % of an aluminum compound reckoned as Al$_2$O$_3$, and 3 to 20 mol % of silicon oxide.

According to the present invention, furthermore, the composition is so adjusted that the molar ratio SiO$_2$/RE$_2$O$_3$ of oxides of rare earth elements (RE$_2$O$_3$) to the silicon oxide (SiO$_2$) is from 2 to 5 and, particularly, from 2.3 to 4. This ratio is limited because of the reason that when the ratio is not smaller than 2, the sintering proceeds and resistance against oxidation increases, too. When the ratio is not smaller than 5, however, the surface layer undergoes decomposition, whereby voids are formed and the hardness decreases.

The mixture having the above-mentioned composition is molded into the shape of a predetermined cutting tool and is fired. The molding method may be press molding, cast molding, extrusion molding, injection molding or cold hydrostatic pressure molding. Here, the molding and the firing may be simultaneously carried out like a hot press method, as a matter of course.

According to the present invention, the firing is executed in an atmosphere which contains a nitrogen gas and an SiO gas at a temperature of from 1700° to 2000° C. and, particularly, from 1750° to 1850° C. When no SiO gas is contained in the atmosphere, the decomposition of the surface layer is not completely suppressed. Besides, in an atmosphere of nitrogen gas only, the decomposition of the silicon nitride is not completely suppressed. When the silicon nitride is to be used as a cutting tool, therefore, the fired surface must be polished by an amount of not smaller than 10 μm. When the atmosphere contains the SiO gas only without nitrogen, the silicon nitride undergoes the decomposition at the above-mentioned firing temperature and the surface is coarsened.

Into a firing furnace are introduced the nitrogen gas, the molded article, as well as the SiO$_2$ powder or a mixture powder of the silicon powder and the SiO$_2$ powder in amounts depending upon the volume of the molded article.

The firing temperature is limited to lie within the above-mentioned range. This is because when the firing temperature exceeds 2000° C., the decomposition of the surface layer is no longer suppressed. When the firing temperature is not higher than 1700° C., on the other hand, the firing does not proceed to a sufficient degree, and a densely sintered product is not obtained.

Examples of the firing method include hot press method, normal pressure firing method, nitrogen gas pressure firing method, as well as hot hydrostatic pressure firing method (HIP) after the firing and the HIP firing method while sealing the molded article with a glass.

In addition to the above-mentioned components, the sintered product of silicon nitride of the present invention may further contain dispersed therein metals of the Groups 4a, 5a and 6a of periodic table such as Ti, Ta, V, W and Mo, as well as carbides, nitrides and silicates thereof or SiC as particles or whiskers, in order to improve properties of the sintered product.

In the thus obtained cutting tool, the face and the flank that serve as a cutting surface can be used in the form of the fired surface, or may be polished by an amount of not larger than 10 μm. The cutting surface can be polished by sand blasting or the like method inexpensively.

According to the cutting tool of the present invention as described above, additives and, particularly, the amounts of their addition to the silicon nitride are so controlled that the molar ratio SiO$_2$/RE$_2$O$_3$ of the oxides of rare earth elements (RE$_2$O$_3$) to the silicon oxide (SiO$_2$) is from 2 to 5, and the composition is fired in an atmosphere containing a nitrogen gas and an SiO gas at a relatively low temperature of from 1700° to 2000° C. for a short period of time. At the same time, components of the molded article are suppressed from being decomposed, and voids are little formed in the fired surface. Besides, the sintered product exhibits improved oxidation resistance and enhanced cutting property.

Moreover, since the SiO gas is contained in the atmosphere at the time of firing the sintered product, a highly hard layer having a micro-Vicker's hardness of not smaller than 16 GPa can be formed on the surface.

As a result, there is obtained a favorably fired surface, i.e., a highly dense surface without voids by polishing the cutting surface by an amount which is not larger than 10 μm. It is therefore allowed to decrease the cost that was not possible with the working according to the prior art.

According to the cutting tool of the present invention, furthermore, the surface layer has a hardness of not smaller than 16 GPa which is higher than that of the interior thereof. Therefore, the cutting tool exhibits excellent abrasion resistance, excellent cutting property particularly when a cast iron is cut, and extended cutting life.

EXAMPLES (Example 1)

A powder of silicon nitride (BET specific surface area of 9 m$^2$/g, α ratio of 98%, amount of oxygen of 1.2% by weight), powders of oxides of rare earth elements, a powder of silicon oxide and a powder of aluminum oxide were mixed together to obtain compositions as shown in Table 1, and were molded in a metal mold into the shape of a tool SNMN 120412 under a pressure of 1 t/cm$^2$.

The molded article, a silicon powder and an SiO$_2$ powder at a molar ratio of 1/1 and in amounts of about 10% of the molded article, were put into a pot of silicon nitride, and were fired in a nitrogen stream under normal pressure and under the conditions shown in Table 1.

The fired surfaces of the obtained samples were polished by sand blasting in amounts as shown in Table 1, subjected to the cutting test under the conditions described below, and were evaluated for their cutting performance relying upon the time until the flank wear at the blade tip was 0.2 mm or until the blade tip was broken. The results were as shown in Table 2. Furthermore, the cutting surface was mirror-worked using a diamond paste, and a diamond tip of 200 g was caused to hit the mirror surface perpendicularly thereto in compliance with JIS B 7725 to form 10 hit scars. Micro-Vicker's hardnesses were calculated from the shapes of the hit scars and average values were found therefrom as shown in Table 2. (Conditions for Cutting Test)

| Material to be cut | FC-25 |
| --- | --- |
| Cutting speed | 400 m/min. |
| Feed | 0.2 mm/rev. |
| Depth of cut | 2.0 mm |

Samples marked with * lie outside the scope of the invention.

According to the results of Tables 1 and 2, the samples Nos. 8 and 9 having molar ratios $SiO_2/RE_2O_3$ which were smaller than 2 or not smaller than 5, and the sample No. 20 without containing alumina, exhibited decreased hardnesses in the surface layers. Furthermore, the samples Nos. 18 and

TABLE 1

| Sample No. | Composition (mol %) | | | | | Ratio $SiO_2/$ $RE_2O_3$ | Firing condition Temp (°C.) × Hr | Kind of atmospher gas ($N_2$ pressure) | Polishing amount (μm) |
| --- | --- | --- | --- | --- | --- | --- | --- | --- | --- |
| | $Si_3N_4$ | $RE_2O_3$ | | $Al_2O_3$ | $SiO_2$ | | | | |
| 1 | 85 | $Y_2O_3$ | 3 | 5 | 7 | 2.3 | 1750 × 5 | SiO, $N_2$ (9 atm) | 0 |
| 2 | 85 | $Yb_2O_3$ | 3 | 5 | 7 | 2.3 | 1750 × 5 | SiO, $N_2$ (9 atm) | 0 |
| 3 | 85 | $Er_2O_3$ | 3 | 5 | 7 | 2.3 | 1750 × 5 | SiO, $N_2$ (9 atm) | 5 |
| 4 | 80 | $Y_2O_3$ $Br_2O_3$ | 3 2 | 5 | 10 | 2.0 | 1750 × 5 | SiO, $N_2$ (9 atm) | 10 |
| 5 | 82 | $Y_2O_3$ | 4 | 5 | 9 | 2.3 | 1750 × 5 | SiO, $N_2$ (9 atm) | 0 |
| 6 | 80 | $Y_2O_3$ | 5 | 5 | 10 | 2.0 | 1750 × 5 | SiO, $N_2$ (9 atm) | 0 |
| 7 | 76 | $Y_2O_3$ | 6 | 5 | 13 | 2.2 | 1750 × 5 | SiO, $N_2$ (9 atm) | 0 |
| *8 | 85 | $Y_2O_3$ | 5 | 5 | 5 | 1.0 | 1750 × 5 | SiO, $N_2$ (9 atm) | 0 |
| *9 | 74 | $Y_2O_3$ | 3 | 5 | 18 | 6.0 | 1750 × 5 | SiO, $N_2$ (9 atm) | 0 |
| 10 | 80 | $Y_2O_3$ | 5 | 3 | 12 | 2.4 | 1750 × 5 | SiO, $N_2$ (9 atm) | 5 |
| 11 | 79 | $Er_2O_3$ | 6 | 2 | 13 | 2.2 | 1750 × 5 | SiO, $N_2$ (9 atm) | 5 |
| 12 | 83 | $Yb_2O_3$ | 3 | 5 | 9 | 3.0 | 1850 × 5 | SiO, $N_2$ (9 atm) | 0 |
| 13 | 86 | $Lu_2O_3$ | 3 | 3 | 8 | 2.7 | 1850 × 5 | SiO, $N_2$ (9 atm) | 0 |
| 14 | 88 | $Yb_2O_3$ | 3 | 2 | 7 | 2.3 | 1800 × 5 | SiO, $N_2$ (9 atm) | 0 |
| 15 | 77 | $Y_2O_3$ | 5 | 5 | 13 | 2.6 | 1750 × 5 | SiO, $N_2$ (9 atm) | 0 |
| 16 | 77 | $Y_2O_3$ | 5 | 5 | 13 | 2.2 | 1900 × 5 | SiO, $N_2$ (9 atm) | 0 |
| 17 | 75 | $Y_2O_3$ | 5 | 5 | 15 | 3.0 | 1750 × 5 | SiO, $N_2$ (9 atm) | 0 |
| *18 | 85 | $Y_2O_3$ | 3 | 5 | 7 | 2.3 | 2050 × 5 | SiO, $N_2$ (9 atm) | 0 |
| *19 | 85 | $Y_2O_3$ | 3 | 5 | 7 | 2.3 | 1650 × 5 | SiO, $N_2$ (9 atm) | 0 |
| *20 | 90 | $Y_2O_3$ | 3 | — | 7 | 2.3 | 1750 × 5 | SiO, $N_2$ (9 atm) | 5 |
| 21 | 85 | $Y_2O_3$ | 3 | 5 | 7 | 2.3 | 1850 × 5 | SiO, $N_2$ (9 atm) | 0 |
| *22 | 85 | $Y_2O_3$ | 3 | 5 | 7 | 2.3 | 1850 × 5 | $N_2$ (9 atm) | 0 |
| *23 | 85 | $Y_2O_3$ | 3 | 5 | 7 | 2.3 | 1800 × 5 | SiO | 0 |
| *24 | 72 | $Y_2O_3$ | 5 | 8 | 15 | 2.0 | 1850 × 5 | SiO, $N_2$ (9 atm) | 0 |
| *25 | 95.5 | $Y_2O_3$ | 1 | 0.5 | 3 | 3.0 | 1850 × 5 | SiO, $N_2$ (9 atm) | 0 |

Samples marked with * lie outside the scope of the invention.

TABLE 2

| Sample No. | Hardness (Gpa) | | Cutting Performance (min) |
| --- | --- | --- | --- |
| | Surface layer | Interior | |
| 1 | 17.2 | 16.7 | 11 |
| 2 | 17.3 | 16.6 | 12 |
| 3 | 17.2 | 16.6 | 10 |
| 4 | 16.5 | 16.2 | 8 |
| 5 | 17.0 | 16.5 | 10 |
| 6 | 16.5 | 16.2 | 8 |
| 7 | 16.3 | 15.9 | 7 |
| *8 | 13.5 | 15.2 | 2 |
| *9 | 12.8 | 15.5 | 1 |
| 10 | 16.4 | 16.2 | 10 |
| 11 | 16.4 | 15.9 | 7 |
| 12 | 17.0 | 16.5 | 12 |
| 13 | 17.1 | 16.7 | 13 |
| 14 | 17.2 | 16.5 | 12 |
| 15 | 16.6 | 16.2 | 10 |
| 16 | 16.3 | 15.8 | 9 |
| 17 | 16.3 | 15.5 | 6 |
| *18 | 15.5 | 15.2 | 2 |
| *19 | 14.7 | 14.8 | 2 |
| *20 | 15.1 | 15.0 | 1 |
| 21 | 16.7 | 16.4 | 10 |
| *22 | 15.1 | 16.2 | 2 |
| *23 | Si melt | | |
| *24 | 15.3 | 15.4 | 1 |
| *25 | 14.5 | 14.3 | 1 |

19 which were fired at temperatures lower than 1700° C. or not lower than 2000° C. exhibited decreased hardnesses in the surface layers and decreased cutting performance. In contrast with these comparative examples, the samples based upon the present invention all possessed surface layers having hardnesses of not smaller than 16 GPa and exhibited excellent performance for cutting cast iron.

According to the present invention as described above in detail, the composition can be densely sintered through the firing at a relatively low temperature of from 1700° to 2000° C. for a short period of time and, at the same time, components in the molded product are suppressed from being decomposed, voids are formed less in the fired surface, and a favorably fired surface is obtained. Besides, the sintered product exhibits improved oxidation resistance and cutting property, and the cutting surface may be polished in an amount of not larger than 10 μm to form a highly dense surface without voids. This makes it possible to decrease the cost of working.

In the cutting tool of the present invention, furthermore, the surface layer has a hardness of not lower than 16 GPa which is greater than that of the 0 interior thereof, and exhibits excellent abrasion resistance, excellent cutting property in cutting, particularly, cast iron, as well as extended cutting life.

We claim:

1. A cutting tool composed of silicon nitride comprising chiefly a β-silicon nitride crystal phase and containing a grain boundary phase of rare earth elements, silicon, aluminum, oxygen and nitrogen, wherein the cutting surface is constituted by at least a fired surface or a surface formed by removing and polishing the fired surface by an amount of not larger than 10 μm, and has in the mirror surface thereof a micro-Vicker's hardness which is higher than that of the interior thereof and is not smaller than 16 Gpa, wherein the cutting tool contains 1 to 10 mole % of rare earth element calculated as an oxide, 1 to 10 mole % of aluminum calculated as an oxide, and 3 to 20 mole % of impurity oxygen calculated as $SiO_2$, the total amount of these calculated values being 5 to 25 mole %.

2. A cutting tool according to claim 1 wherein the ratio of the $SiO_2$ calculated value ($SiO_2$) of the impurity oxygen to the oxide calculated value ($RE_2O_3$) of the rare earth element, $SiO_2/RE_2O_3$ is 2 to 5.

* * * * *